United States Patent
Ori

[15] 3,684,938
[45] Aug. 15, 1972

[54] WIPER ASSEMBLY FOR VEHICLES
[72] Inventor: Takaaki Ori, Nagoya, Japan
[73] Assignee: Nippondenso Co., Ltd., Aichi-ken, Japan
[22] Filed: July 12, 1971
[21] Appl. No.: 161,626

[30] Foreign Application Priority Data
   Aug. 4, 1970   Japan ................... 45/68140

[52] U.S. Cl. ............ 318/443, 15/250.12, 318/DIG. 2
[51] Int. Cl. .................................................. H02p 1/04
[58] Field of Search ............ 318/443, 494, DIG. 2; 15/250.12

[56] References Cited
UNITED STATES PATENTS 3,118,164   1/1964   Deibel et al. ............... 318/443
3,168,758   2/1965   Oishei et al. ............ 318/443 X

FOREIGN PATENTS OR APPLICATIONS 1,574,000   6/1969   France ...................... 318/443

Primary Examiner—Benjamin Dobeck

[57] ABSTRACT

A wiper assembly for vehicles, in which the intermittent operation of a wiper motor is effected by using a coupling mechanism, such as a fluid coupling mechanism, the maximum transmitting torque of which varies in proportion to the rate of rotation.

3 Claims, 13 Drawing Figures

INVENTOR

TAKAAKI ORI

BY Cushman, Darby & Cushman
ATTORNEYS

INVENTOR

TAKAAKI ORI

INVENTOR

TAKAAKI ORI

BY Cushman, Darby & Cushman
ATTORNEYS

WIPER ASSEMBLY FOR VEHICLES

This invention relates to a wiper assembly for vehicles which is very useful in a drizzling rain and continuously operable itermittently.

Conventional wiper assemblies of the type described include one which comprises an electronic intermittent operation mechanism utilizing semiconductors such as transistors. This type of wiper assembly, however, has the disadvantages that a large number of component parts and many soldering operations required in assembling work add to the cost of the wiper assembly, and that the characteristic change of the semiconductors due to a temperature change results in a variation in the interval of intermittent operations. There has also been known a wiper assembly of the type comprising a bimetallic intermittent operation mechanism, but this type is also unsatisfactory in that the production and adjustment of a bimetal requires a skill and in that bimetals heating means provides the danger of fire.

In order to eliminate the above-described disadvantages, the present invention has for its object the provision of a wiper assembly for vehicles, in which a wiper motor is intermittently operated by using a coupling mechanism, such as a fluid coupling, in which the maximum transmitting torque varies in proportion to rotation, whereby an intermittent operation mechanism can be composed of a relatively less number of component parts which can be fabricated by machining and hence are adapted for mass production; and which, therefore, can be produced easily at a low cost and is capable of intermittent operation with good temperature characteristic.

The present invention will be described in detail hereunder with reference to a plurality of typical embodiments thereof shown of in the accompanying drawing. In the drawing, FIG. 1 is a sectional view of an embodiment of the wiper assembly according to the present invention;

Figure 1:
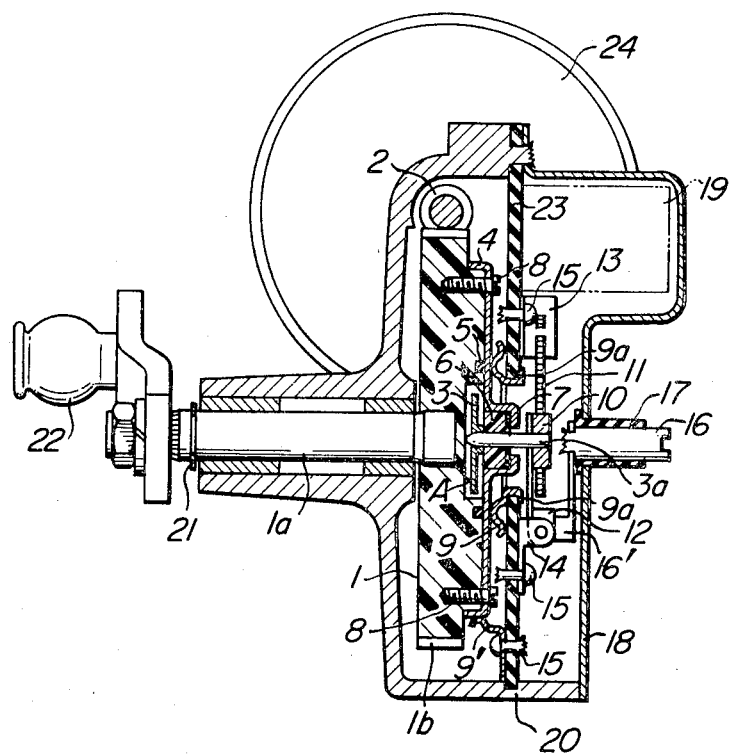

An embodiment of the invention shown in FIGS. 1 and 2 will be described at first. FIG. 1 is a sectional view showing the mechanical construction of one embodiment of the invention and FIG. 2 is an exploded perspective view of FIG. 1.

Figure 2:
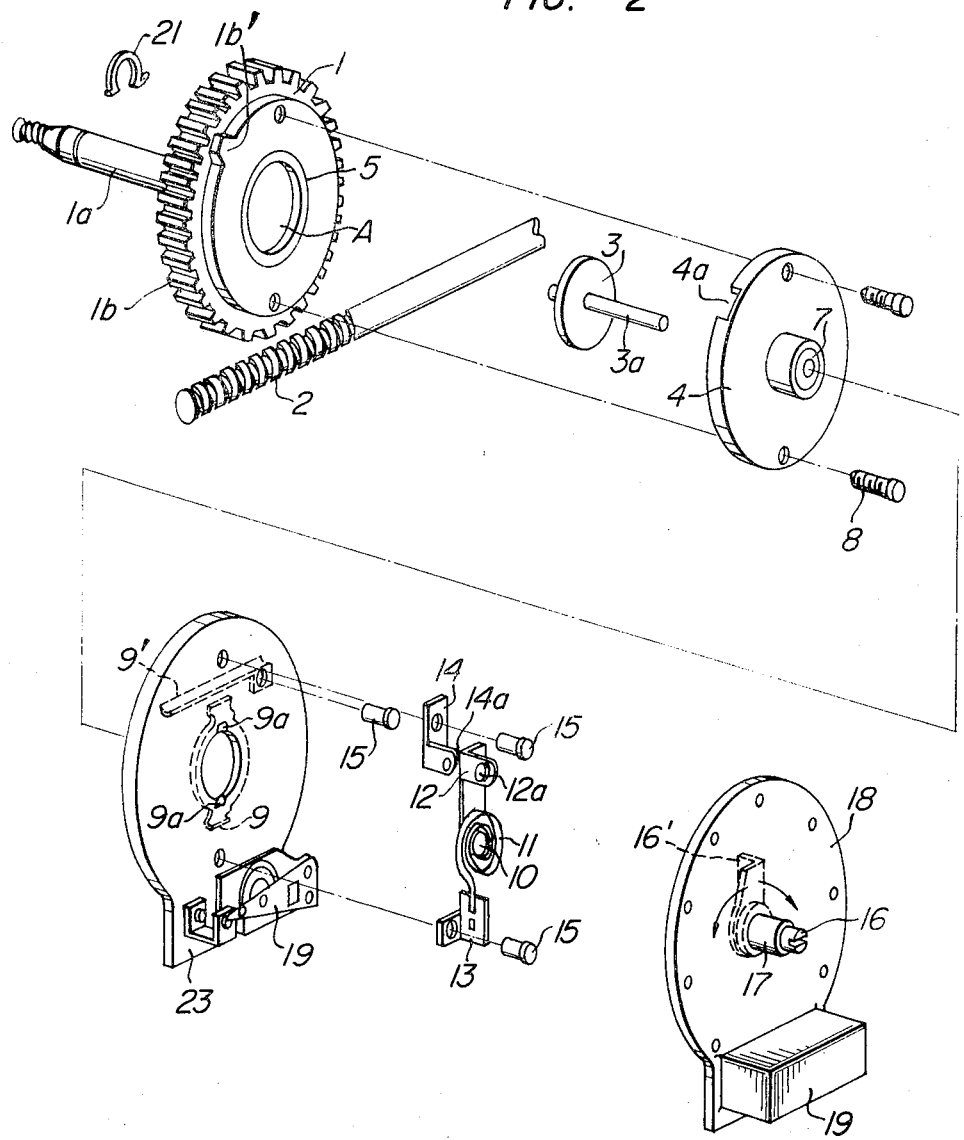
FIG. 2 is an exploded perspective view of the wiper assembly of FIG. 1.

In FIGS. 1 and 2, reference numeral 1 designates a worm gear on the output side of a wiper motor 24, which is composed of an output shaft 1a and a resin-made worm gear 1b. Reference numeral 2 designates a worm gear formed on the armature shaft of the motor 24. The worm gear 1b, as shown in FIG. 1, has a recess A formed at the center of one end face thereof and a metal cap 4 is secured to the worm gear 1b by means of screws 8, covering said recess A. A disc impeller 3 is disposed in the recess A and further, a viscous fluid, such as silicon oil, of which viscosity is not susceptible to temperature change is sealed in said recess A. The recess A, the impeller 3 and the viscous fluid together form a fluid coupling. An impeller shaft 3a is electrically insulated from the cap 4 by means of a resin-made bearing 6 force-fitted in the cap 4, and is smoothly rotatable in said coupling. An oil seal 7 is provided to prevent the fluid in the recess A from leaking to the outside. Between the cap 4 and the worm gear 1b is disposed an O-ring-shaped oil seal 5 to prevent a fluid leakage, said oil seal 5 being fitted in a groove formed in the end face of the worm gear. An insulating plate 23 is fixed in a housing 20 and a metallic elastic brush 9 is fixed on said insulating plate 23 at a portion 9a for sliding movement on the end face of the cap 4. Further, a metallic elastic member 9' is secured to the insulating plate 23 by means of a rivet 15 for sliding movement on the outer peripheral surface of the cap 4. The cap 4 is formed with a notch 4a in the peripheral edge thereof as shown in FIG. 2 and a projection 1b' of the worm gear 1b is received in said notch 4a. It will thus be understood that the brushes 9 and 9' are electrically insulated from each other only when the brush 9' is located at the position of the notch 4a in the cap 4 incident to rotation of the worm gear 1b.

On the opposite side of the insulating plate 23 relative to the cap 4 is disposed a metallic helical spring 11 with one end anchored to a fixing stud 10 which is press-fitted into the impeller shaft 3a. Thus, the helical spring 11 is wound up incident to rotation of the impeller 3. The other end of the helical spring 11 is secured to a metallic bracket 13 which is fixed on the insulating plate 23 by means of a rivet 15. A point arm 12 is secured to the stud 10 and a fixed electric contact 12a is provided on said arm 12. The contact 12a on the arm 12 is opposed by a contact 14a which is provided on a bracket 14 secured on the insulating plate 23 by means of a rivet 15. Reference numeral 18 designates a cover having an insulating bush 17 and a shaft 16 is received in said bush 17 in tight engagement therewith so that said shaft 16 will not be allowed to rotate under a torque smaller than a certain value. A stopper 16' is fixedly mounted on the shaft 16, which serves to stop the rotation of the point arm 12. Reference numeral 19 designates an electromagnetic relay having an electric construction as shown within the block 19 in FIG. 3 or 4 to be described later. The output shaft 1a of the worm gear 1 extends through the housing 20 and is held against movement in the direction of thrust by means of a clip 21. Reference numeral 22 designates a classic arm connected with a wiper link mechanism, and 24 designates a wiper motor unit.

Figure 3:
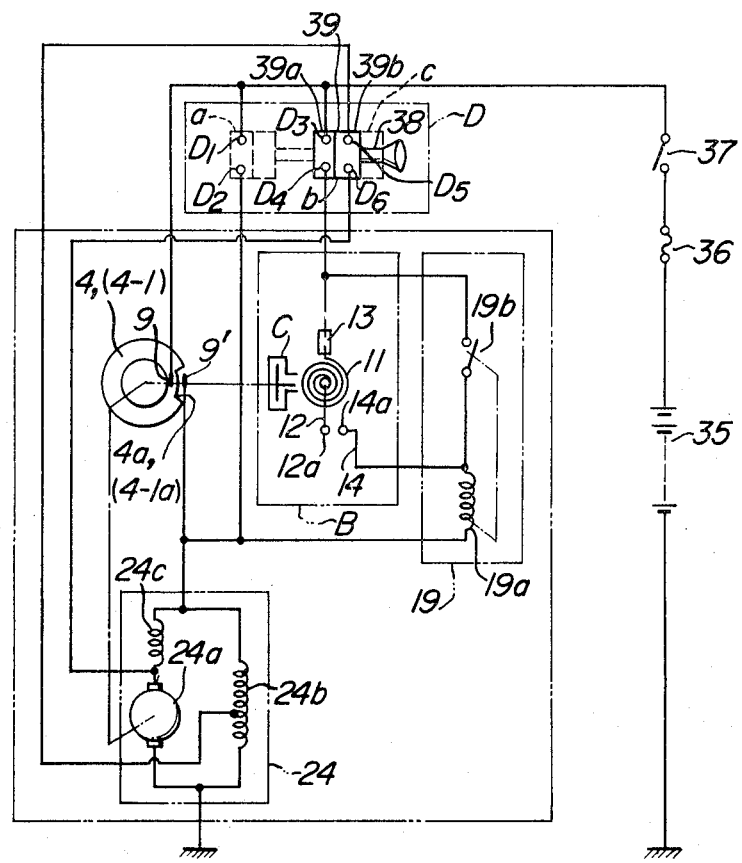
FIGS. 3 and 4 are electric circuit diagrams of the wiper assembly.

The electric circuit of the wiper assembly constructed as described above will be described with reference to FIGS. 3 and 4. Referring first to FIG. 3, reference numeral 4 indicates the cap shown in FIGS. 1 and 2 described above and 24 indicates the wiper motor which is a compound motor comprising an armature 24a, a shunt coil 24b and a series coil 24c.

The block B is the fluid coupling mechanism and the contact mechanism described above, and the block 19 is the electromagnetic relay. A normally-open contact 19b of the electromagnetic relay 19 is connected in parallel with the contact 12a on the point arm 12 and the fixed contact 14a on the bracket 14. The contact 19b is closed when a coil 19a is energized by the operating current for the wiper motor 24. The brushes 9, 9' cooperate with the cap 4 to provide a switching mechanism. Namely, the brushes 9 and 9' are electrically disconnected from each other to stop the motor 24 only when said brush 9' is located in register with the notch 4a of the cap 4, thus forming the so-called automatic fixed position stopping contact mechanism. The block D is a wiper switch having a movable member 39. The movable member 39 is operated by an operating knob 38 and consists of electrically insulated two movable elements 39a and 39b. The arrangement is such that contacts $D_1$, $D_2$ only are closed when the movable member 39 is in a position a; contacts $D_3$, $D_4$ only are closed when the movable member 39 is in a position b; and contacts $D_5$, $D_6$ only are closed when the movable member 39 is in a position c. Reference numeral 37 designates an ignition key switch, 36 a fuse and 35 a car battery providing a power source.

The wiper assembly of the invention having the electric circuit described above operates as follows: Namely, when the key switch 37 is in a closed position and the movable member 39 of the wiper switch D is in the position b, a current flows from the battery 35 through the key switch 37, the contacts $D_3$, $D_4$ and the fixed bracket 13 to the helical spring 11, and thence through the point arm 12 and the contacts 12a, 14a to the bracket 14. Because the contacts 12a of the point arm 12 is constantly urged into contact with the contact 14a under the restoring force of the helical spring 11. From the bracket 14, the current is supplied through the relay coil 19a to the wiper motor 24 and thus said wiper motor 24 is set in motion. At the same time, the relay coil 19a is energized, so that the relay contact 19b is closed and the worm gear 1b is rotated by the wiper motor 24. In this case, the impeller 3 which is enclosed in the recess A of the worm gear 1b, together with the viscous fluid, rotates under the rotational torque of the worm gear 1b. The maximum transmitting torque varies in accordance with the rate of rotation of the worm gear 1b and and theoretically is proportional to the square of said rate of rotation. Since the worm gear 1b of the wiper motor 24 therefore rotates at a relatively high rate, a relatively strong torque is transmitted to the impeller and the helical spring 11 is wound up under said torque. Further, as a result of the rotation of impeller 3, the contact 12a on the point arm 12, fixed to the shaft 3' of said impeller, is disconnected from the contact 14a on the bracket 14.

In this case, the current is continuously supplied to the wiper motor 24 through the contact 19b, since said contact 19b is held closed as stated above even after the contacts 12a 14a have been disconnected from each other. Thus, the wiper motor 24 continues its rotation. Now, when the cap 4 overlying the worm gear 1b rotates, together with said gear 1b, to a position to connect electrically the brushes 9, 9' with each other, the opposite ends of the relay 19 are electrically shorted and the potentials at said ends are equalized, so that the current no longer flows through the relay coil 19a. Consequently, the coil 19a is deenergized and the contact 19b is opened, and the wiper motor 24 continues its operation with the current supplied thereto through the the brushes 9, 9'. The rotation of the point arm 12 is limited at this point, by the stopper 16'. However, since the worm gear 1b continues to rotate under the drive of the wiper motor 24, the result is that the impeller 3, which has been stopped by the stopper 16' through the point arm 12, makes idling in the viscous fluid. When the worm gear 1b completes its full turn, the cap 4 is again located in the position shown in FIG. 3, so that the brushes 9, 9' are opened again and the current supply to the wiper motor 24 is interrupted, resulting in stoppage of said motor. In this case, the armature 24a of the motor 24 tends to rotate continuously under the force of inertia but is stopped abruptly under the effect of dynamic braking, since a short circuit is formed across the opposite ends of the armature 24a due to closure of the contacts $D_5$, $D_6$ of the wiper switch D. Therefore, in no cases will the brush 9' be brought into electrical contact with the brush 9 upon passing over the notch 4a, and will the motor 24 not be stopped, but the motor can be stopped positively in a fixed position. Upon stoppage of the motor 24, the impeller which has been restrained from rotation by the stopper 16', idles in the reverse direction within the recess A under the biasingfforce of the helical spring 11 which has previously been wound up. Because, since the maximum transmitting torque of the fluid coupling mechanism is proportional to the square of the rate of rotation due to the characteristic of fluid, as stated above, when the worm gear 1b on the input side of said fluid coupling mechanism stops rotating, the maximum transmitting torque of said fluid coupling mechanism becomes extremely small and the impeller 3 is returned by the slight force or the slight spring load of the helical spring while idling slowly being subjected to the braking force of the viscous fluid. As a result, the contact 12a on the point arm 12 is again brought into contact with the contact 14a on the bracket 14 and hence the wiper motor 24 is again set in motion. The above-described operation is repeated, causing the wiper to make an intermittent operation highly suitable in a drizzling rain.

The interval of the successive intermittent operations is provided by the period from the time when the wiper motor 2 is stopped to the time when the contact 12a on the point arm 12 is brought into contact with the contact 14a on the bracket 14 as a result of slow idling of the impeller 3 under the biasing force of the helical spring 11. This interval can be extended by increasing the rotatable angle of the point arm 12 or can be shortened by decreasing said rotatable angle, upon changing the position of the stopper 16' by rotating the shaft 16.

When the movable member 39 of the wiper switch D is located in the position a, the current is supplied from the battery 35 directly to the wiper motor 24 and, therefore, said motor operates continuously. In this case, the point arm 12 is allowed to rotate only through a certain angle by the stopper 16' and held against rotation after rotating through said limited angle. However, the continuous rotation of the worm gear 1b will not cause any mechanical or electrical trouble because the result is only that the impeller idles in the viscous fluid.

In the circuit of FIG. 3, however, there may be the fear of the contacts 12a, 14a being worn out due to the fact that the operating current flows through the wiper motor 24 for a very short period until the contact 19b is closed through said contacts 12a, 14a. In this view, the circuit arrangement shown in FIG. 4 is recommendable, particularly for a wiper assembly which is required to be serviceable for an extended period.

Figure 4:
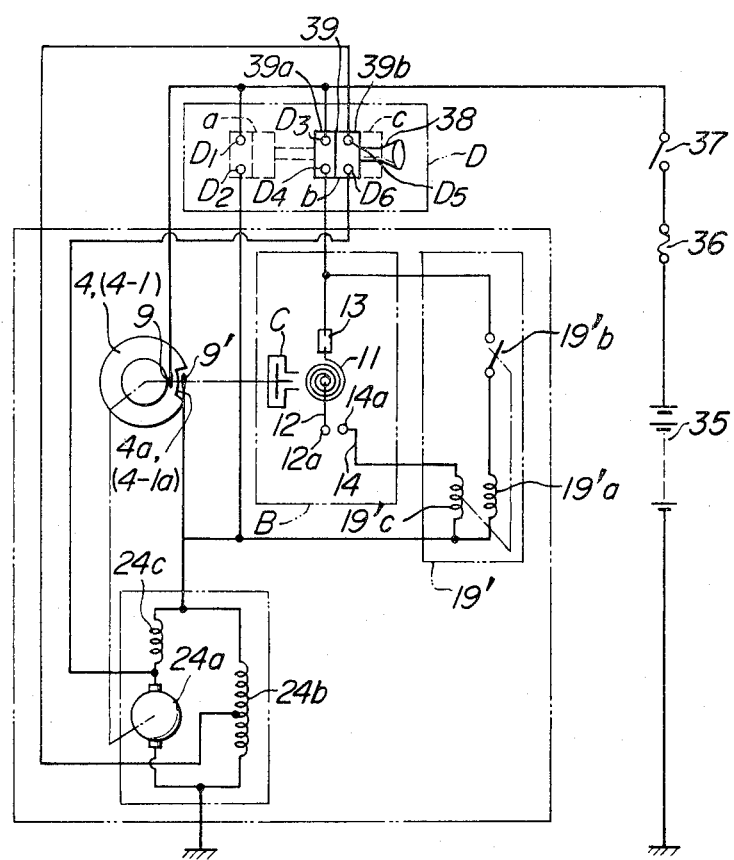

The difference between the circuit arrangements of FIGS. 3 and 4 lies only in that the electromagnetic relay 19 in FIG. 3 is replaced by one generally iddicated by numeral 19'. This electromagnetic relay 19' includes, as an exciting coil, a voltage coil 19'c in addition to the current coil 19'a, and both coils 19'a, 19'c are wound in the cumulative fashion. In this circuit arrangement, the current supplied through the contacts 12a, 14a flows initially through a path extending from the voltage coil 19'c to the wiper motor 24. However, because of the high impedance of the voltage coil 19'c, the wiper motor 24 is not actuated due to a large voltage drop in said coil 19'c. On the other hand, the relay contact 19'b is closed to energization of the voltage coil 19'c, and a circuit is formed extending from the contact 19'b through the current coil 19'a to the wiper motor 24, through which the wiper motor 24 is set in motion. The subsequent operation is the same as that of the circuit of FIG. 3 and will not be reiterated herein. In short, the circuit arrangement of FIG. 4 differs from that of FIG. 3 only in that the voltage coil 19'c which is energized with a slight current, is added to the circuit of FIG. 3, for the purpose of protecting the contacts 12a, 14a. By the addition of the voltage coil 19'c, the contacts 12a, 14a pass only a slight current therethrough and hence inexpensive contacts of small current capacity can be utilized for said contacts 12a, 14b and the useful life of the circuit can be substantially prolonged.

Figure 5:
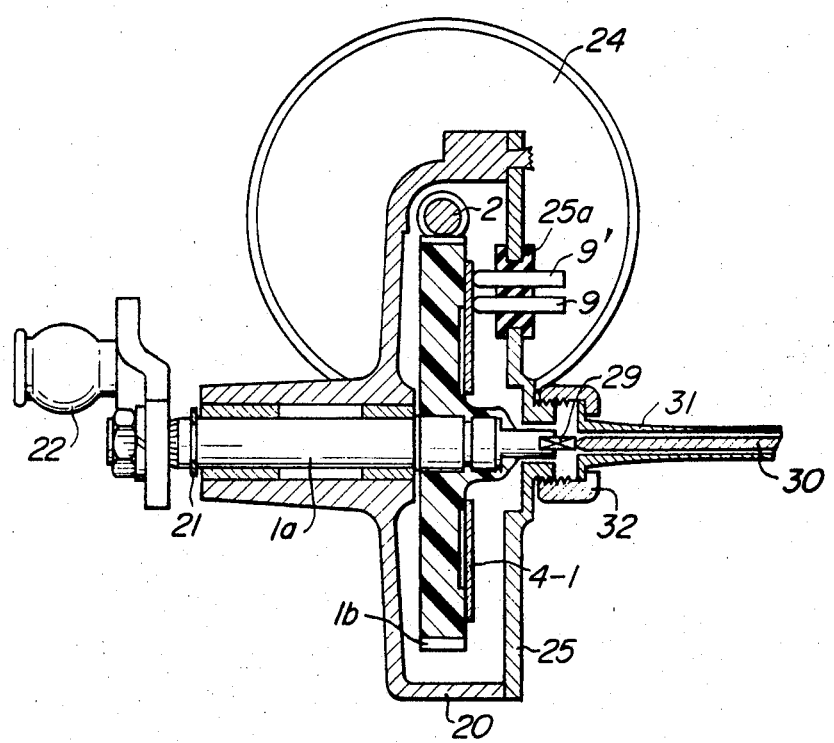
FIGS. 5 and 6 are sectional view of another embodiment of the invention.

Another embodiment of the present invention will be described with reference to FIGS. 5 - 8 hereunder. In the preceding embodiment, the motor unit and the intermittent operation controlling mechanism are integral with each other, but in this embodiment they are separated from each other so that the intermittent operation controlling mechanism may be located adjacent the instrument panel even when the motor unit cannot be located in a position accessible to the operator due to a limited space or other reasons, and the interval of the successive intermittent operations may be adjusted easily by controlling remotely said motor unit from said controlling mechanism. In the embodiment of FIGS. 5 - 8 which will be described practically hereunder, the same reference numerals as those in the preceding embodiment designate the same parts and the descriptions of these parts will be omitted. FIG. 5 shows the motor unit provided with an automatic fixed position stopping contact mechanism. In this motor unit, a plate-like electric cam 4–1 as shown in FIG. 7 is fixed on one end face of the worm gear 1b, by means of claws 4–1b formed at the inner peripheral edge thereof, said electric cam 4–1 having a notch 4–1a formed at a portion thereof. The brushes 9, 9' are supported by a cover 25 through an insulating member 25a, for contact with the electric cam 4–1. The arrangement is such that the brushes 9, 9' are electrically disconnected from each other only when the brush 9' is located within the notch 4–1a of the electric cam as shown in FIG. 7. Reference numeral 30 designates a flexible shaft connecting the shaft is of the worm gear 1b with a fluid coupling housing 1c to be described later, and having square keys 29 at the opposite ends thereof which are received in said shaft 1a and said housing 1c respectively. Reference numeral 31 designates a flexible tube surrounding the flexible shaft 30 and having the opposite ends thereof secured to the cover 25 and a cover 27 of the intermittend operation controlling mechanism to be described later, respectively.

Figure 6:
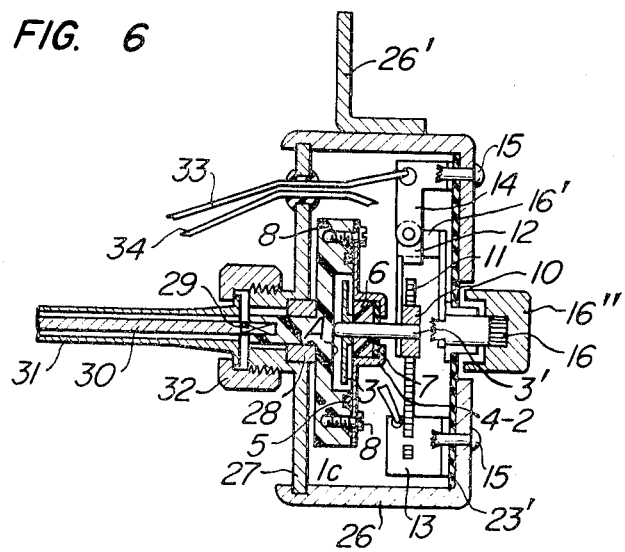
Figure 7:
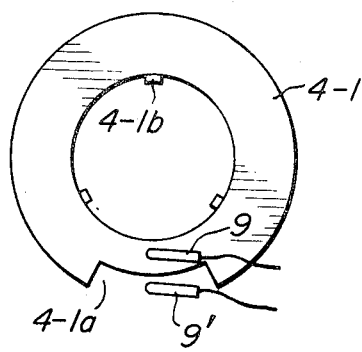
FIGS. 7 and 8 are a plan view of the cap and a front elevational view of the relay respectively.
Figure 8:
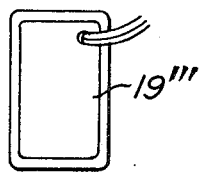

FIG. 6 shows the intermittent operation controlling mechanism. The fluid coupling housing 1c is driven by the worm gear 1a of the motor unit through the flexible shaft 30. The housing 1c is formed with a recess A, in which the viscous fluid and the impeller 3 are sealed by means of a cap 4–2. The fluid coupling mechanism is composed of the housing 1c, the impeller 3 and the viscous fluid. Reference numeral 23' designates an insulating plate, 26 a housing of the controlling mechanism, 26' a fitting by which said housing is secured to the instrument panel or the like, 28 a bearing, and 33 and 34 electric conductors by which the intermittent operation controlling mechanism is electrically connected with a relay 19''' provided separately and shown in FIG. 8, the electric circuit of said relay 19'' being similar to that of the relay 19 or 19' in the preceding embodiment. Reference numeral 16'' designates an adjusting knob fixed on the shaft 16.

It will be obviously understood that this embodiment of the invention constructed as described above operates in the same manner as the preceding embodiment when the electric circuit is arranged as in FIG. 3 or 4.

Figure 9:
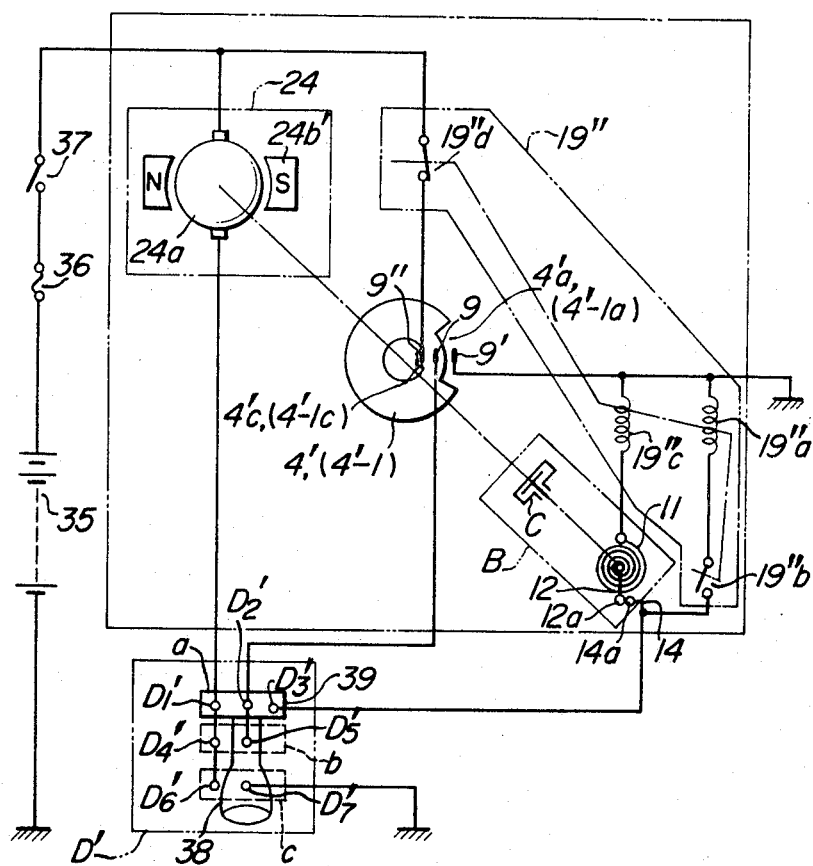
FIG. 9 is an electric circuit diagram of the wiper assembly of FIGS. 5 and 6.

The foregoing description has been given on a winding field-type wiper motor, but in case of a permanent magnet field-type wiper motor the dynamic braking circuit is different from that of the winding field-type wiper motor and hence a slight change must be made to the electric circuit of the wiper assemblies of the invention described above. The permanent magnet field-type wiper motor will be described hereunder with reference to FIG. 9 in which the same parts as those in the preceding embodiments are indicated by the same reference numerals and will not be described again. Reference numeral 24b' designates a permanent magnet field of the wiper motor, and reference character D' designates a wiper switch which is arranged such that the contacts $D'_1$ $D'_2$ and $D'_3$ thereof are closed when the movable member 39 is in the position a; the contacts $D'_4$, $D'_5$ are closed when the movable member 39 is in the position b; and the contacts $D'_6$, $D'_1$ are closed when the movable member 39 is in the position c. Reference numeral 4' designates a cap corresponding to the cap 4 in FIG. 3, and 9, 9' and 9'' designate brushes arranged for contact with said cap 4'. The cap 4' is formed with a notch 4'a and a projection 4'c, by which the brushes 9, 9'' are electrically connected with each other at first and then disconnected in the meantime and again connected with each other a while later, during one revolution of said cap 4', and returned to the original positions at the point when said cap has made a complete turn. Reference numeral 19'' designates an electromagnetic relay which is composed of cumulatively wound current coil 19''a and voltage coil 19''c, and a normally-open contact 19''b and a normally-closed contact 19″d which are operated when either one of said coils 19″a, 19″c is energized, respectively.

The wiper assembly of the invention having the circuit arrangement described above, operates in the following manner: Namely, when the key switch 37 is held in a closed position and the movable member 39 of the wiper switch D′ is located in the position a, a circuit is formed extending from the battery 35 to the ground through the relay contact 19″d, the brush 9″, the brush 9, the wiper switch D′, the contact 14a on the bracket 14, the contact 12a on the point arm 12, the helical spring 11 and the voltage coil 19″c. Therefore, when the contact 19″b is closed in this state, the contact 19″d is opened concurrently, so that a circuit extending from the battery to the ground through the armature 24a, the wiper switch D′, the relay contact 19″b and the current coil 19″a is formed, setting the wiper motor 24 in motion. Consequently, the cap 4″ is rotated and the brushes 9, 9″ are electrically disconnected and then connected with each other, so that a circuit is formed now, extending from the battery 35 to the ground through the armature 24a, the wiper switch D′, the brush 9 and the brush 9′, and the opposite ends of the series circuit of the coil 19″a and contact 19″b of the relay 19″ are electrically shorted, rendering said relay 19″ inoperative, whereby the contact 19″b is opened and the contact 19″c closed. Here, the wiper motor 24 continues its rotation while being supplied with the current through said circuit, and the helical spring 11 is wound up under the torque of the worm gear 1b transmitted thereto through the fluid coupling mechanism C, whereby the contact 12a on the point arm 12 is disconnected from the contact 14a on the bracket 14. The rotation of the point arm 12 is limited by the stopper 16′ and the impeller in the fluid coupling mechanism C rotates idly therein. The cap 4″ returns to the position of FIG. 9 upon completion of the complete turn of the worm gear 1b and the brushes 9, 9′ are electrically disconnected from each other. As the same time, the brushes 9, 9″ are electrically connected with each other, with the result that the current supply circuit for the wiper motor is broken and a short circuit is formed across the opposite ends of the armature 24a. The wiper motor 24 is stopped abruptly by the dynamic braking action of the short circuit.

When the wiper motor 24 has been stopped, the point arm 12 is returned to the original position, similar to the preceding embodiments, by the function of the fluid coupling mechanism C and the contact 12a thereon is brought into contact with the contact 14a on the bracket 14, whereby the above-described operation is repeated again.

Figure 10:
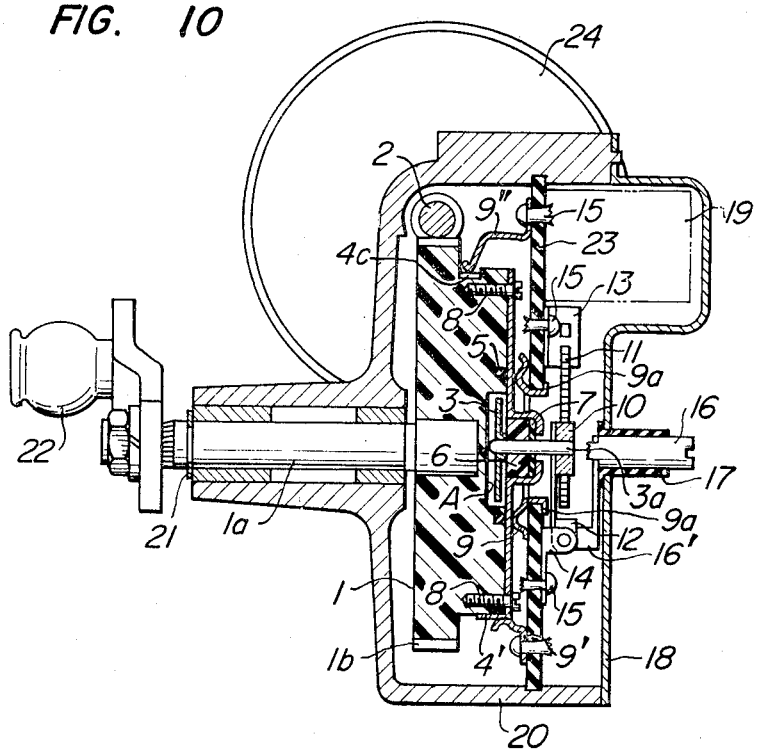
FIG. 10 is a sectional view showing the construction of the wiper assembly of FIGS. 5 and 6.
Figure 11:
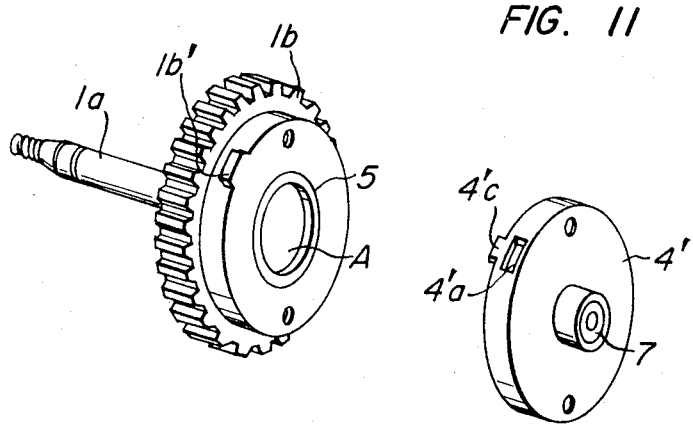
FIG. 11 is an exploded perspective view of the essential portion of the construction shown in FIG. 10.
Figure 12:
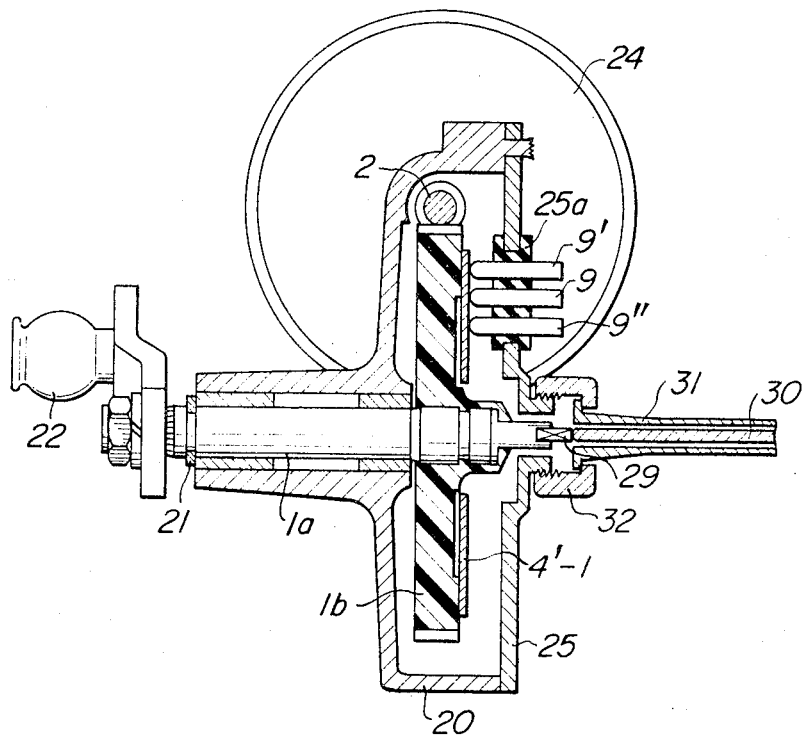
FIG. 12 is a sectional view showing the construction of the wiper assembly.
Figure 13:
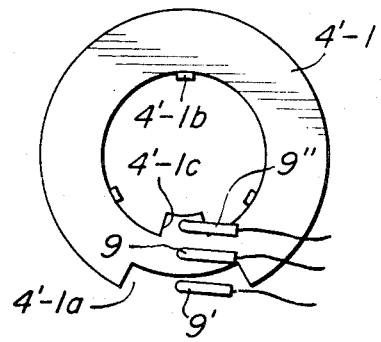
FIG. 13 is a plan view of the cap.

For reference, the mechanical construction of the subject wiper assembly which performs the above-described operation will be described with reference to FIGS. 10 – 13. FIG. 10 shows a construction wherein the motor unit and the intermittent operation controlling mechanism are arranged integrally with each other. The difference of this construction from that of FIG. 3 lies in the fact that the brush 9″ is secured to the insulating plate 23 by means of the rivet 15 and the cap 4′ is provided with a projection 4′c as shown in FIG. 11. FIG. 12 shows the motor unit only in the case wherein the motor unit and the intermittent operation controlling mechanism are provided separately from each other. The difference of this motor unit from that of FIG. 5 lies in the fact that the electric cam 4′-1 is provided with a projection 4′-1c as shown in FIG. 13 and the brush 9″ is secured to the cover 25 through an insulating member 25a.

In each of the embodiments described above, the worm gear 1b rests for a certain period of time on every rotation during the intermittent operation and accordingly the wiper performs the wiping operation once at a time. However, by reducing the rotational speed of the cap 4 (4′) or electric cam 4–1 (4′–1) by which the automatic fixed position stopping contact mechanism is operated, such that it makes one revolution during two revolutions of the worm gear 1b, it is possible to obtain two wiping operations of the wiper at a time. Further, the interval of the intermittent wiping operation can be adjusted by varying the position of the stopper 16′ but may also be adjusted by varying the viscosity of the viscous fluid, the spring constant of the helical spring, the diameter of the impeller 3 or the gap between the impeller 3 and the housing.

As described herein, according to one aspect of the invention a wiper assembly for vehicles, having a wiper motor connected to a power source through automatic fixed position stopping contacts, comprises a coupling mechanism having its driving side connected with the output shaft of said wiper motor and being of such character that the maximum transmitted torque thereof varies in proportion to the rate of rotation like that of a fluid coupling mechanism, a helical spring provided on the driven side of said coupling mechanism and wound up by the rotation of said wiper motor, a main contact provided on the driven side of said coupling mechanism and opened by the operation of said wiper motor, and a relay which is excited from the time when said main contact is closed, thereby to form a current supply circuit for said wiper motor and also a self-holding circuit, said current supply circuit for the wiper motor formed by said relay being connected in parallel with said automatic fixed position stopping contacts, whereby when the current supply circuit for the wiper motor is formed on actuating of the relay and said wiper motor is set in motion, the helical spring is wound by through the coupling mechanism, and at the same time, the main contact is opened and the automatic fixed position stopping contacts are closed, so that the relay is deenergized and the stopping contacts are opened to stop the wiper motor. Here, the driven side of the coupling mechanism is rotated idly under the baising force of the helical spring which has thus been wound up and after a set period of time, the main contact is again closed and the motor is set in motion through the relay. This, it is possible to obtain an intermittent operation which is highly advantageous in a drizzling rain. Further, the wiper assembly of the invention involves a more number of machined parts than in the conventional one comprising an electronic intermittent operation mechanism, so that by producing these parts on the mass production basis, the cost of the wiper assembly can be reduced drastically. Furthermore, as compared with the conventional bimetallic intermittent operation mechanism, the intermittent operation mechanism used in the subject wiper assembly is composed of parts the majority of which are those commonly used heretofore, such as a helical spring used in speedometers of automobiles and the parts of fluid mechanisms used as a shock absorbing mechanism for the speedometers. Therefore, the wiper assembly of the invention has the remarkable advantage that it can be produced easily and at a low cost, without encountering any particular difficulty. In the fluid coupling mechanism of the subject wiper assembly is used a fluid, such as silicon coil, the viscosity of which is not varied by temperature change. Therefore, there is the advantage that the interval of the intermittent operation will not be changed by the ambient temperature. A further advantage of the subject wiper assembly is that, even when the driven side of the coupling mechanism is locked for some reasons, the slippage of the coupling mechanism occurs, thus precluding any serious trouble.

According to another aspect of the invention, the wiper assembly of the character described above is arranged such that the current which is conducted through a voltage coil of the relay only is led to the main contact and the operating current for the motor is not led thereto. Therefore, there is the advantage that a small-sized, inexpensive contact having a small current capacity can be used for the main contact.

According to still another aspect of the invention, the wiper assembly of the character described above further comprises a dynamic braking circuit which is closed when the automatic stopping contacts are opened, to electrically short the opposite ends of the wiper motor, and a normally-closed contact provided in the relay for breaking said dynamic braking circuit, whereby when a permanent magnet-type motor is used for the wiper motor, there can be achieved such advantages that the motor can be stopped quickly by the function of said dynamic braking circuit and thereby the wiper can also be stopped positively in a set position, and that conduction of a shorting current through the dynamic braking circuit at the start of the motor can be avoided as said dynamic braking circuit is broken by the relay contact.

What is claimed is:

1. A wiper assembly for vehicles, having a wiper motor connected to a power source through automatic fixed position stopping contacts, which comprises a coupling mechanism having its driving side connected with the output shaft of said wiper motor and being of such character that the maximum transmitting torque thereof varies in proportion to the rate of rotation like that of a fluid coupling mechanism, a helical spring provided on the driven side of said coupling mechanism and wound up by the rotation of said wiper motor, a main contact provided on the driven side of said coupling mechanism and opened by the operation of said wiper motor, and a relay which is excited from the time when said main contact is closed, thereby to form a current supply circuit for said wiper motor and also a self-holding circuit, said current supply circuit for the wiper motor formed by said relay being connected in parallel with said automatic fixed position stopping contacts.

2. A wiper assembly for vehicles, having a wiper motor connected to a power source through automatic fixed position stopping contacts, which comprises a coupling mechanism having its driving side connected with the output shaft of said wiper motor and being of such character that the maximum transmitting torque thereof varies in proportion to the rate of rotation like that of a fluid coupling mechanism, a helical spring provided on the driven side of said coupling mechanism and wound up by the rotation of said wiper motor, a main contact provided on the driven side of said coupling mechanism and opened by the operation of said wiper motor, and a relay composed of a voltage coil which can be energized through a wiper switch when said main contact is closed, a normally-opened contact which is closed when said voltage coil is energized and a current coil which is connected in series with said normally-opened contact; the series circuit of said voltage coil of said relay and said main contact, the series circuit of said normally-opened contact and said current coil, and said automatic fixed position stopping contacts being connected in parallel.

3. A wiper assembly for vehicles, having a permanent magnetic field-type wiper motor connected to a power source through automatic fixed position stopping contacts, which comprises a coupling mechanism having its driving side connected with the output shaft of said wiper motor and being of such character that the maximum transmitting torque thereof varies in proportion to the rate of rotation like that of a fluid coupling mechanism, a helical spring provided on the driven side of said coupling mechanism and wound up by the rotation of said wiper motor, a main contact provided on the driven side of said coupling mechanism and opened by the operation of said wiper motor, and a relay energized from the time when said main contact is closed, thereby to form a current supply circuit for said wiper motor and also a self-holding circuit, said current supply circuit for said wiper motor formed by said relay being connected in parallel with said automatic fixed position stopping contacts and further there being provided a dynamic braking circuit which is closed when said automatic fixed position stopping contacts are opened, to electrically short the opposite ends of said wiper motor, and said relay having a normally-closed contact for opening said dynamic braking circuit.

* * * * *